(12) United States Patent
Hama et al.

(10) Patent No.: US 6,392,773 B1
(45) Date of Patent: May 21, 2002

(54) MULTI-BEAM SCANNING OPTICAL SYSTEM

(75) Inventors: Yoshihiro Hama; Yasushi Suzuki; Taminori Odano, all of Saitama-ken; Susumu Mikajiri, Chiba-ken, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 29 days.

(21) Appl. No.: 09/699,359

(22) Filed: Oct. 31, 2000

(30) Foreign Application Priority Data

Nov. 1, 1999 (JP) .......................................... 11-310489

(51) Int. Cl.$^7$ ............................................. G02B 26/08
(52) U.S. Cl. ........................ 359/204; 359/206; 359/216
(58) Field of Search ................................ 359/204–207, 359/216–219; 347/233, 243, 244

(56) References Cited

U.S. PATENT DOCUMENTS

| | | | |
|---|---|---|---|
| 4,937,664 A | | 6/1990 | Chiku et al. |
| 4,962,983 A | | 10/1990 | Watanabe |
| 5,181,137 A | | 1/1993 | Koide |
| 5,208,456 A | * | 5/1993 | Appel et al. ................ 359/204 |
| 5,784,094 A | | 7/1998 | Ota et al. |
| 5,796,520 A | | 8/1998 | Maruyama |
| 5,841,566 A | | 11/1998 | Minakuchi et al. |
| 6,115,164 A | | 9/2000 | Kamikubo |
| 6,124,962 A | | 9/2000 | Kamikubo |
| 6,178,029 B1 | * | 1/2001 | Kamikubo ................. 359/204 |

FOREIGN PATENT DOCUMENTS

| | | |
|---|---|---|
| JP | 1-142674 | 6/1989 |
| JP | 1-164917 | 6/1989 |
| JP | 2-58015 | 2/1990 |
| JP | 6-160743 | 6/1994 |
| JP | 9-5656 | 1/1997 |
| JP | 10133131 | 5/1998 |

* cited by examiner

*Primary Examiner*—James Phan
(74) *Attorney, Agent, or Firm*—Greenblum & Bernstein, P.L.C.

(57) ABSTRACT

A multi-beam scanning optical system is provided with a light source unit, polygonal mirror, and an fθ lens. The fθ lens includes first, second and third lenses. The beams emitted by the light source unit are incident on the first, second and third lenses in this order. The first lens consists of two lens elements, the first lens element converges the plurality of beams in an auxiliary scanning direction. The second lens element converges the plurality of beams in a main scanning direction. A plurality of convex surfaces, which correspond to the plurality of beams and converge the plurality of beams in the auxiliary scanning direction, respectively, are formed on one of surfaces of the first and second lens elements. Further, a diffraction lens structure for compensating for lateral chromatic aberration caused by a refraction lens structure of the fθ lens system is formed on each of the plurality of convex surfaces.

10 Claims, 7 Drawing Sheets

MULTI-BEAM SCANNING OPTICAL SYSTEM

BACKGROUND OF THE INVENTION

The present invention relates to a multi-beam scanning optical system in which a plurality of light beams emitted from a plurality of light sources are deflected to scan on a surface to be scanned.

A scanning optical system to be employed in a laser printer for forming a monochrome (e.g., a black-and-white) image is provided with a laser diode, which is driven in accordance with image data. The laser beam emitted by the laser diode is collimated by a collimating lens, and is directed to a deflecting member such as a polygonal mirror. The laser beam, which is incident on light reflecting surfaces of the rotating polygonal mirror, is deflected to scan within a predetermined angular range. The scanning laser beam is incident on an fθ lens, refracted and converged thereby, and then is incident on an evenly charged photoconductive surface of a photoconductive drum to form a beam spot which moves along the rotational axis of the photoconductive drum (i.e., along a main scanning direction). Since the laser diode is driven in accordance with the image data, the surface of the photoconductive drum is exposed to light corresponding to the image data. While the light beam scans on the surface of the photoconductive drum, it is rotated (i.e., an auxiliary scanning is performed). Thus, a two-dimensional latent image is formed on the photoconductive surface of the photoconductive drum.

Then, toner is applied to the latent image to form a developed image, which is transferred onto a recording sheet and fixed thereon.

Recently, color laser beam printers, which are capable of forming color images, have been developed. In the color laser printer, generally, a plurality of laser diodes are provided (which will be referred to as a multi-beam laser printer). Further, the corresponding number of fθ lenses, and the corresponding number of photoconductive drums are provided for forming images of respective color components (e.g., yellow, magenta, cyan and black components). The above-described, exposing and developing processes are performed for each color component, and the images (developed images) for the four color components are transferred on a recording sheet and fixed.

In the multi-beam laser printer as described above, a plurality of laser diodes are provided. A laser diode has a characteristic such that the temperature thereof increases when driven to emit the laser beam. Further, when the temperature increases/decreases, the wavelength of the laser beam emitted by the laser diode increases/decreases. Therefore, if each of the plurality of laser diodes are driven at different timing, temperature differences occur among the laser diodes, and accordingly, the wavelengths of the laser beams emitted by the laser diodes become different from each other.

An fθ lens of the scanning optical system is configured to exhibit the same optical characteristic to the light beams which have the same wavelength. However, if the wavelengths of the light beams are different from each other, lateral chromatic aberration become significant, and length of scanning lines formed by each beams may become different. If such a problem occurs in the above-described color laser beam printer, positional differences in the main scanning direction occur among each color components, which results in a color shift of the color image finally recorded on a recording sheet.

SUMMARY OF THE INVENTION

In view of the above problems, it is an object of the present invention to provide an improved scanning optical system in which the positional differences, in the main scanning direction, of the images formed by the plurality of beams having different wavelengths can be suppressed.

For the above object, according to one aspect of the invention, there is provided a multi-beam scanning optical system, which includes a light source unit emitting a plurality of light beams, the plurality of beams being parallel to each other, a polygonal mirror having a plurality of reflection surfaces arranged along a rotational direction of the polygonal mirror, the plurality of beams emitted by the light source unit being incident on the polygonal mirror and reflected by the reflection surfaces of the polygonal mirror, and an fθ lens system, the plurality of beams reflected by the reflection surface of the polygonal mirror passing through the fθ lens system and proceeding toward surfaces to be scanned. In such a scanning optical system, the fθ lens includes a first lens, a second lens and a third lens, the plurality of beams deflected by the polygonal mirror being incident on the first, second and third lenses in this order. The first lens consists of a first lens element and second lens element, the plurality of beams being incident on the first and second lens elements in this order, the first lens element converging the plurality of beams in an auxiliary scanning direction, the second lens element converging the plurality of beams in a main scanning direction. Further, a plurality of convex surfaces corresponding to the plurality of beams are formed on one of surfaces of the first and second lens elements, the plurality of convex surfaces extending in the main scanning direction, the plurality of convex surfaces converging the plurality of beams in the auxiliary scanning direction, respectively, a diffraction lens structure for compensating for lateral chromatic aberration caused by a refraction lens structure of the fθ lens system being formed on each of the plurality of convex surfaces.

With this configuration, shift of the imaging areas for each color components due to the lateral chromatic aberration of the refraction lens structure of the fθ lens can be suppressed.

Optionally, the convex surfaces are formed on a light receiving surface of the first lens element.

In particular, the first lens, which includes the first lens element, converges the plurality of beams mainly in the auxiliary scanning direction.

Alternatively, the convex surfaces are formed on a light emerging surface of the second lens element.

In this case, the first lens, which includes the second lens, may converge the plurality of beams mainly in the auxiliary scanning direction.

Further optionally, the first lens element, the second lens element and the diffraction lens structure are integrally formed.

In a particular case, the second lens may converge the plurality of beams mainly in the main scanning direction.

According to another aspect of the invention, there is provided a multi-beam scanning optical system, which includes a light source unit emitting a plurality of light beams, the plurality of beams being parallel to each other, a polygonal mirror having a plurality of reflection surfaces arranged along a rotational direction of the polygonal mirror, the plurality of beams emitted by the light source unit being incident on the polygonal mirror and deflected by the reflection surfaces of the polygonal mirror, an fθ lens system, the plurality of beams reflected by the reflection surface of the polygonal mirror passing through the fθ lens system and proceeding toward surfaces to be scanned, and a cover member that surrounds the polygonal mirror, at least a first portion, through which the plurality of beams directed to the polygonal mirror enter, and a second portion, from which the plurality of beams reflected by the polygonal mirror emerge, are formed to be light transmitting portions. In this case, a plurality of diffraction lens structures corresponding to the plurality of beams for compensating for lateral chromatic aberration caused by a refraction lens structure of the fθ lens system are formed at least on the second portion.

With this configuration, shift of the imaging areas for each color components due to the lateral chromatic aberration of the refraction lens structure of the fθ lens can be suppressed.

Optionally, a through opening is formed on the cover member, and a light transmitting member fitted in the opening, the light transmitting member including the first and second portions.

In a particular case, the plurality of diffraction lens structure are formed either of the first and second portions.

DESCRIPTION OF THE EMBODIMENT

Hereinafter, the invention will be described with reference to the accompanying drawings. It should be noted that in the embodiments described below, the multi-beam scanning optical system according to the invention is applied to a color printer for forming a color image in accordance with an electrophotographic imaging process.

Figure 1:
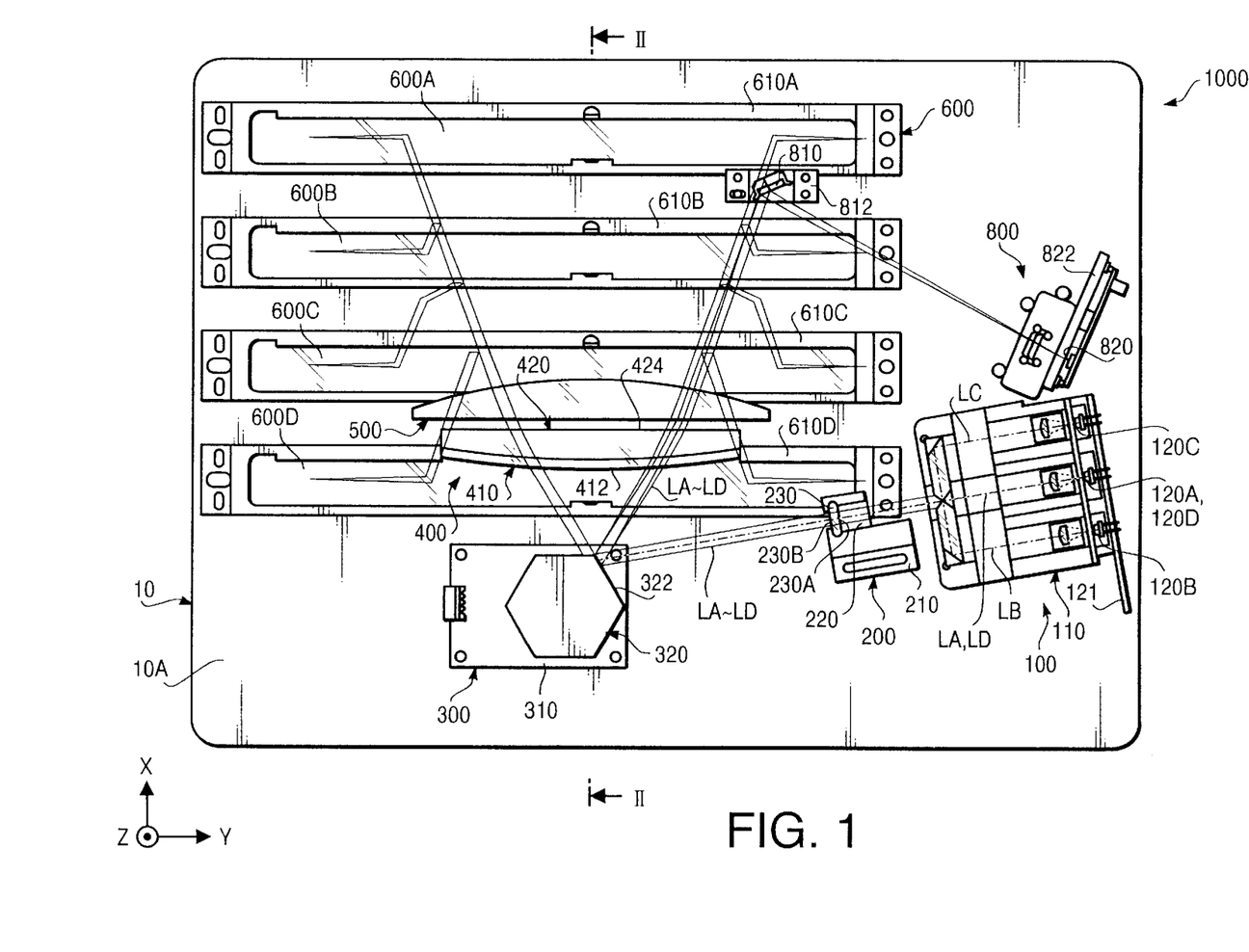
FIG. 1 is a plan view of a multi-beam scanning optical system according to a first embodiment of the present invention.
Figure 2:
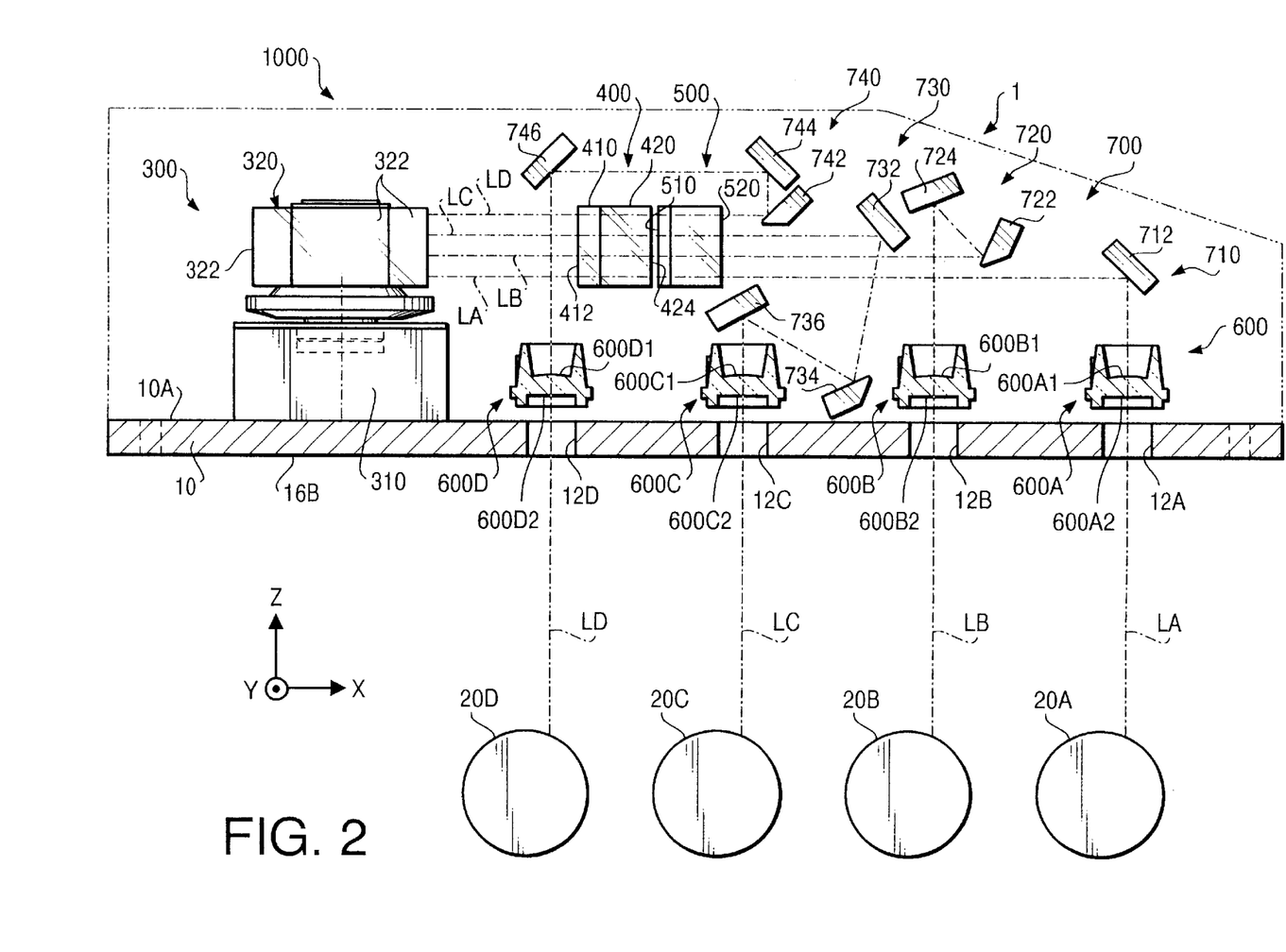
FIG. 2 is a cross sectional view of the multi-beam scanning optical system taken along line II—II in FIG. 1.

FIG. 1 is a plan view schematically showing a structure of a multi-beam scanning optical system 1000. FIG. 2 schematically shows a cross sectional view of the multi-beam scanning optical system 1000 taken along line II—II in FIG. 1.

The multi-beam scanning optical system 1000 includes a housing 1. FIG. 1 shows an arrangement of various elements provided on an upper surface 10A of the bottom plate 10 of the housing 1. As shown in FIG. 1, the light source unit 100, a cylindrical lens unit 200, a polygonal mirror unit 300, a first lens 400, a second lens 500, third lenses 600 (including lenses 600A–600D), a mirror unit 700, a horizontal synchronizing signal detection unit 800, and the like are mounted on the upper surface 10A of the bottom plate 10. In FIG. 1, an XYZ coordinate system is indicated. In the XYZ coordinate system, X-axis is parallel with the optical axis of the lenses 400 and 500, Y-axis is parallel to the upper surface 10A and perpendicular to the X-axis, and Z-axis is perpendicular to X-axis and Y-axis.

As shown in FIG. 2, the bottom plate 10 extends horizontally (i.e., parallel to an X-Y plane) when the scanning optical system is in use, and four photoconductive drums 20A–20D are arranged in X-axis direction at a predetermined interval with respect to each other, with a predetermined clearance provided with respect to the lower surface 10B of the bottom plate 10. The rotation axes of the photoconductive drums 20A–20D extend in Y-axis direction, and are parallel to each other.

The four photoconductive drums 20A–20D are provided for forming images of yellow, magenta, cyan and black components, respectively. That is, the latent images formed on the photoconductive drums 20A–20D are developed by applying yellow, magenta, cyan and black toner, and then the developed images are transferred onto a recording sheet in an overlapped manner.

The multi-beam scanning optical system 1000 operates as described below. The light source unit 100 includes four laser diodes 120A–120D for emitting laser beams LA–LD, four collimating lenses for respectively collimating the laser beams LA–LD, and laser driving circuits for driving the laser diodes 120A–120D, respectively.

Four laser beams LA–LD emitted from the light source unit 100 pass through a cylindrical lens 230 and directed to the polygonal mirror unit 300. The beams LA–LD are deflected by the polygonal mirror unit 300 to scan within a predetermined angular range in the main scanning direction, which is parallel to the Y-axis direction.

It should be noted that the optical paths of the four laser beams LA–LD emitted from the light source unit 100 coincide with each other when they are viewed from the top (i.e., along Z-axis), and spaced apart from each other along the Z-axis. As shown in FIG. 2, the beam LB is above the beam LA, the beam LC is above the beam LB, and the beam LD is above the beam LC.

As shown in FIG. 1, the cylindrical lens unit 200 includes a base 210 secured on the upper surface 10A of the bottom plate 10, a lens holder 220 protruded upward (i.e., in the Z-axis direction) from the base 210, and a cylindrical lens 230 held by the lens holder 220.

The cylindrical lens 230 has a light receiving surface 230A, on which the laser beams LA–LD emitted from the light source unit 100 are incident, and a light emerging surface 230B, from which the light beams LA–LD emerge.

The cylindrical lens 230 receives the collimated laser beams LA–LD emitted by the light source unit 100, and converge the same only in the Z-axis direction, i.e., the auxiliary scanning direction.

The focal point of the cylindrical lens 230 is located substantially at the reflection surface 322 of the polygonal mirror 320, and accordingly, at the reflection surface 322, a line-shaped image extending in the main scanning direction is formed.

The polygonal mirror unit 300 includes a motor unit 310 secured on the upper surface 10A of the bottom plate 10, and a polygonal mirror 320 secured to a spindle shaft of the motor unit 310, which extend in Z-axis direction.

The polygonal mirror 320 is formed to be equihexagonal viewed from Z-axis direction, whose side surfaces are formed as the reflection surfaces 322. It should be noted that the reflection surfaces 322 are perpendicular to the horizontal plane (i.e., the X-Y plane).

Each of the reflection surfaces 322 is a single planar surface, onto which the four light beams emitted from the light source unit 100 and passed through the cylindrical lens 230 are incident simultaneously.

The motor 310 is controlled by a not-shown driving circuit to rotate counterclockwise in FIG. 1 at a predetermined speed. As the polygonal mirror 310 rotates, the laser beams LA–LD scan from right-hand side to left-hand side in FIG. 1.

The first lens 400, the second lens 500 and the third lenses 600A–600D constitute an fθ lens system. The fθ lens system converges each of the four laser beams LA–LD on the respective photoconductive drums 20A–20D.

Specifically, the four laser beams LA–LD deflected by the polygonal mirror 320 are incident on the composite lens unit 400, which is secured on the upper surface 10A of the bottom plate 10 via a not-shown lens holder. The first lens 400 is secured on the upper surface 10A of the bottom plate 10, and receives the light beams LA–LD deflected by the polygonal mirror 320.

Figure 3A:
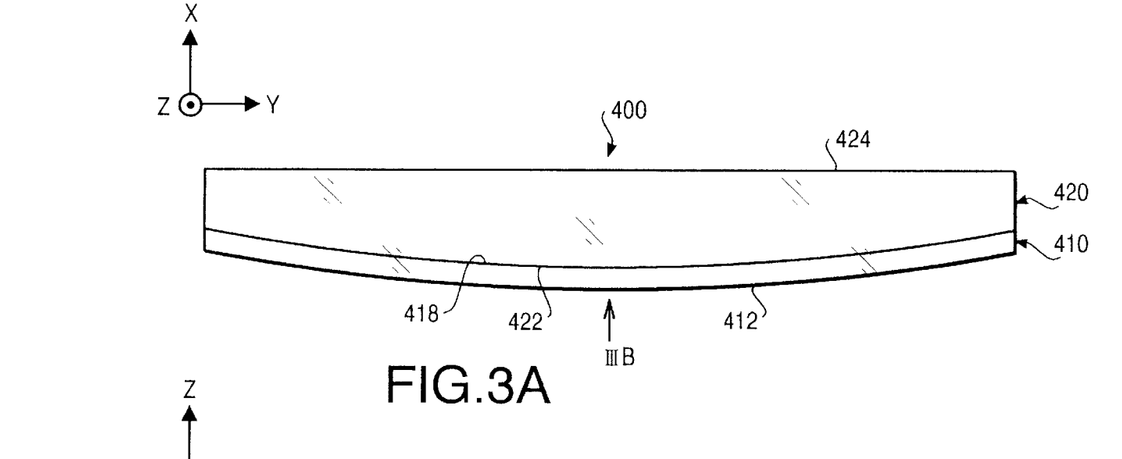
FIG. 3A is a an view of a composite lens unit according to a first embodiment.
Figure 3B:
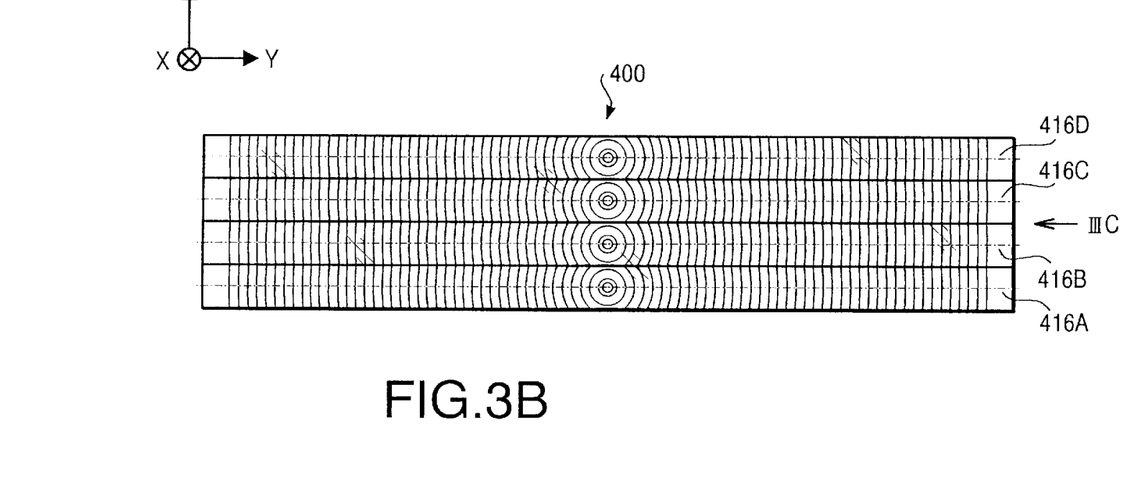
FIG. 3B is a front view of the composite lens unit, viewed along arrow IIIB in FIG. 3A.
Figure 3C:
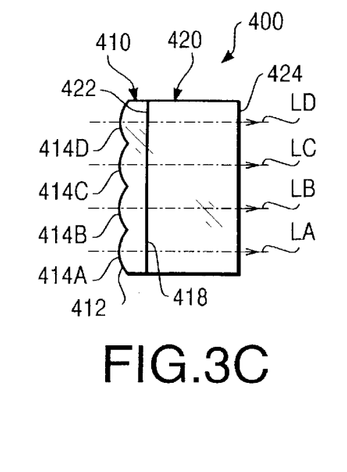
FIG. 3C is a side view of the composite lens unit, viewed along arrow IIIC in FIG. 3B.

FIG. 3A is a plan view of the first lens 400, FIG. 3B is a front view thereof, viewed along arrow IIIB in FIG. 3A, and FIG. 3C is a side view thereof, viewed along arrow IIIC in FIG. 3B.

The first lens 400 consists of the first lens element 410 and the second lens element 420. The laser beams LA–LD are incident on the first and second lens element 410 and 420 in this order.

The first lens element 410 mainly has a power to converge the beams LA–LD in Z-axis direction (i.e., the auxiliary scanning direction), and the second lens element 420 mainly has a power to converge the beams LA–LD in Y-axis direction (i.e., in the main scanning direction). Thus, the first lens 400 converges the laser beams LA–LD both in the Y-axis and Z-axis directions. As a whole, the power in the auxiliary scanning direction is greater than that in the main scanning direction.

The first lens 400 will be described further.

The first lens element 410 has a light receiving surface 412 and a light emerging surface 418. The light receiving surface 412 of the first lens element 410 is formed with convex surfaces 414A–414D for converging the beams LA–LD in the Z-axis direction, respectively, on the light receiving surface 412 (see FIG. 3C). At any cross section taken along a plane including the principal rays of the beams LA–LD and perpendicular to the X-Y plane, of the first lens 400, the principal rays of the beams LA–LD coincide with the optical axes defined by the curvatures of the convex surfaces 414A–414D, respectively. Thus, the laser beams LA–LD evenly arranged in the vertical direction and incident on the light receiving surface 410 is emerged from the light emerging surface 424 of the second lens element 420 evenly arranged in the vertical direction.

As shown in FIG. 3B, the convex surfaces 414A–414D are formed with diffraction lens structures 416A–416D, respectively. Specifically, each of the diffraction lens structures 416A–416D is formed on a base curve, which is a rotationally symmetrical aspherical surface, for compensating for the lateral chromatic aberration caused by the refraction lens structure of the fθ lens system (i.e., the first, second and third lenses 400, 500 and 600).

The second lens element 420 has power to converge the beams LA–LD in the main scanning direction. The light receiving surface 422 of the second lens element 420 is cemented with the light emerging surface 418 of the first lens element 410, and the light emerging surface 424 of the second lens element 420 faces the light receiving surface 510 of the second lens 500 with a predetermined space therebetween.

The first lens 400 is constituted such that, for example, the first lens element 410, the second lens element 420, and the diffraction lens structures 416A–416D are integrally formed using a mold.

In particular, if the first lens element 410 and the diffraction lens structures 416A–416D are formed of synthetic resin, and the second lens element 420 is formed of glass, the first lens 400 can be formed as a lens having a hybrid structure, and therefore, the number of elements constituting the fθ lens system can be reduced.

The second lens 500 has a light receiving surface 510 on which the laser beams LA–LD emerged from the first lens 400 are incident, and a light emerging surface 520 from which the laser beams incident on the second lens 500 are emerged. The second lens 500 is secured on the upper surface 10A of the bottom plate 10 using a holding member (not shown).

The second lens 500 is composed as a single element made of a single material, and all the beams LA–LD pass through the second lens 500.

The second lens 500 has a power to converge each of the beams LA–LD only in the main scanning direction.

The mirror unit 700 is constituted to direct the four laser beams LA–LD emerged from the second lens 500 to the third lenses 600A–600D, respectively.

Specifically, the mirror unit 700 has first to fourth mirror groups 710, 720, 730 and 740.

The first mirror group 710 includes a mirror 712 that directs the laser beam LA emitted by the laser diode 120A to the third lens 600A;

the second mirror group 720 includes mirrors 722 and 724 that direct the laser beam LB emitted by the laser diode 120B to the third lens 600B;

the third mirror group 730 includes mirrors 732, 734 and 736 that direct the laser beam LC emitted by the laser diode 120C to the third lens 600C; and the fourth mirror group 740 includes mirrors 742, 744 and 746 that direct the laser beam LD emitted by the laser diode 120D to the third lens 600D.

The mirrors 712, 722, 724, 732, 734, 736, 742, 744 and 746 are formed to be elongated in the main scanning direction, and secured on the upper surface 10A of the bottom plate 10 using holding members (not shown).

The third lenses 600A–600D are secured on the upper surface 10A of the bottom plate 10 by holders 610A–610D (shown in FIG. 1), respectively. Each of the third lenses 600A–600D has a power mainly for converging the incident beam in the auxiliary scanning direction. The third lenses 600A–600D also have power in the main scanning direction (i.e., the Y-axis direction), the power in the main scanning direction being less than the power in the auxiliary scanning direction.

On the bottom plate 10, below each of the holders 610A–610D, openings 12A–12D extending in the main scanning direction are formed, and below which the photoconductive drums 20A–20D are arranged, respectively.

Thus, the third lenses 600A–600D, each of which extends in the Y-axis direction, are located at portions corresponding to the beams LA–LD, respectively.

The third lenses 600A–600D have light receiving surfaces 600A1–600D1 and light emerging surface 600A2–600D2, respectively.

The positional relationship between the first through fourth mirror groups 710, 720, 730 and 740 with respect to the third lenses 600A–600D will be described.

The mirror 712 of the first mirror group 710 reflects the laser beam emerged from the second lens 500 downward, at 90 degrees when viewed along Y-axis direction, to direct the beam toward the light receiving surface 600A1 of the lens 600A at a right angle when viewed along Y-axis direction.

The mirror 722 of the second mirror group 720 reflects the laser beam emerged from the second lens element 420 upward, by 45 degrees when viewed along Y-axis direction, to direct the beam toward the mirror 724. The mirror 724 reflects the incident beam downward, by 45 degrees when viewed along Y-axis direction, so that the beam is incident on the light receiving surface 600B1 of the lens 600B at a right angle when viewed along Y-axis direction.

The mirror 732 of the third mirror group 730 reflects the laser beam emerged from the second lens 500 obliquely downward to direct the beam toward the mirror 734. The mirror 734 reflects the incident beam obliquely upward to direct the beam to the mirror 736. The mirror 736 reflects the incident beam vertically downward so that the beam is incident on the light receiving surface 600C1 of the lens 600C at a right angle when viewed along Y-axis direction.

The mirror 742 of the fourth mirror group 740 reflects the laser beam emerged from the second lens 500 upward, at 90 degrees when viewed along Y-axis direction, to direct the beam toward the mirror 744. The mirror 744 reflects the incident beam horizontally to direct the beam to the mirror 746. The mirror 746 reflects the incident beam vertically downward when viewed along Y-axis direction so that the beam is incident on the light receiving surface 600D1 of the lens 600D at a right angle when viewed along Y-axis direction.

In the embodiment, the first lens 500 is used for converging the light beams LA–LD mainly in the main scanning direction, and the second lens 500 and third lenses 600A–600D are used for converging the light beam mainly in the auxiliary scanning direction.

With the above-described configuration, the line-shaped image formed at the reflection surfaces 322 of the polygonal mirror 320 is reflected thereby, passed through the first, second and third lenses and converged thereby, and thus, a beam spot is formed on each photoconductive drum.

The horizontal synchronizing signal detection unit 800 includes a single mirror 810, a single light receiving sensor 820, and a control circuit. It should be noted that only one signal unit 800 is provided for the four light beams LA–LD, which will be explained later.

The mirror 810 is provided at an upstream position, along the main scanning direction, out of an area contributing to image formation. The mirror 810 is secured on the upper surface 10A of the bottom plate 10 via a securing member 812 such that the beams LA–LD are reflected by the mirror 810 and incident on the light receiving sensor 820.

The light receiving sensor 820 is secured on the upper surface 10A by a securing member 822 so as to receive the light beams LA–LD reflected by the mirror 810.

A control circuit (not shown) drives the laser diodes 120A–120D in accordance with the light receiving signal output by the light receiving sensor 820, thereby an image formation starting timing, at which the image formation for each line starts, are synchronized. Specifically, the control circuit controls a laser diode driving circuit in the light source unit 100, thereby the laser diodes 120A–120D are driven.

According to the configuration described above, the lateral chromatic aberration of the refractive lens structure of the fθ lens system is compensated by the diffractive lens structure 416A–416D formed on the light receiving surface 412 of the first lens element 410. Therefore, even if the wavelengths of the laser beams LA–LD become different from each other, the image forming areas on the photoconductive drums 20A–20D in the main scanning direction coincide with each other, and therefore, the color shift of the image can be avoided.

In conventional multi-beam scanning optical systems, it was necessary to select laser diodes which emit laser beams having substantially the same wavelength, in order to avoid the shift of the scanning area in the main scanning direction. According to the above-described embodiment, since the shift of the scanning area due to the lateral chromatic aberration is suppressed, the wavelengths of the beams emitted by the laser diodes included in the same light source unit can be distributed within a certain allowable range. Therefore, the cost required for selecting the laser diodes can be lowered.

In the first embodiment, the diffractive lens structures 416A–416D are formed on the convex surfaces 414A–414D (i.e., on the light receiving surface of the first lens 400). Alternatively, the diffractive lens structure can be formed on the light emerging surface 420 of the first lens 400, the light receiving surface 510 or the light emerging surface of the second lens 500, or light receiving surfaces 610 or light emerging surfaces 620 of the third lenses 600.

Further, in the above-described embodiment, the first lens 400 includes the first lens element 410 for converging each beam in the auxiliary scanning direction and the second lens element 420 for converging each beam in the main scanning direction, and each laser beam passes the first and second lens elements in this order.

Alternative to the above structure, the first lens may include a first lens element for converging each beam in the main scanning direction, and a second lens element for converging each beam in the auxiliary scanning direction, and each beam passes through the first and second lens elements in this order. In this case, the convex surfaces and the diffraction lens structures formed on the convex surfaces may be arranged to face the reflection surface 322 of the polygonal mirror 320.

Example of such a modification will be described referring to FIGS. 6A–6C, and FIGS. 7A–7C.

Figure 6A:
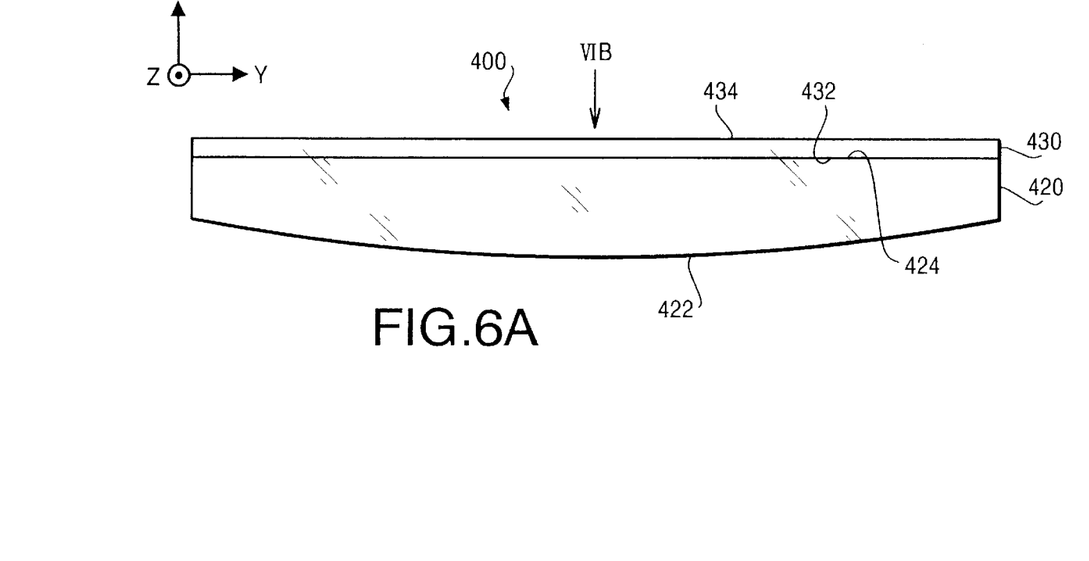
FIG. 6A is a plan view of a first lens according to a modification of the first embodiment.
Figure 6B:
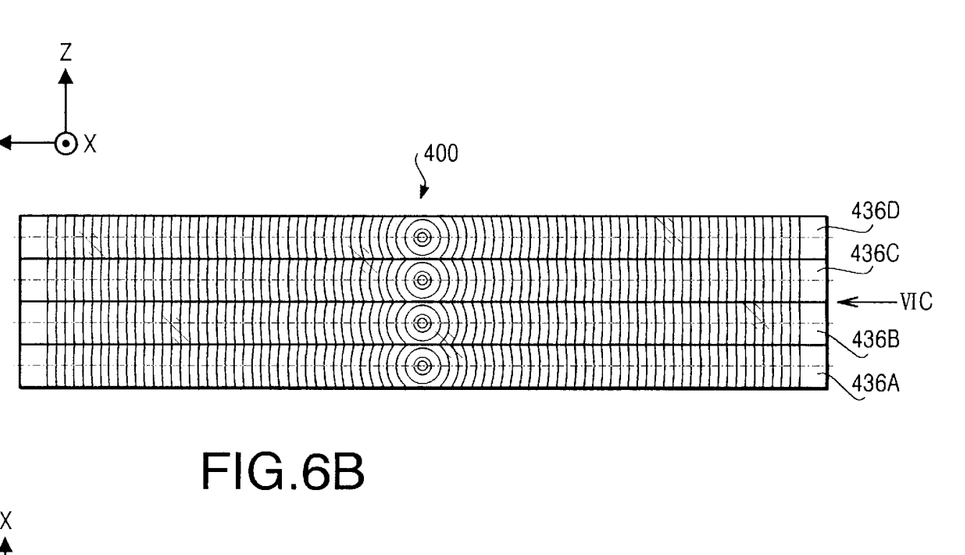
FIG. 6B is a rear view of the first lens, viewed along arrow VIB in FIG. 6A.
Figure 6C:
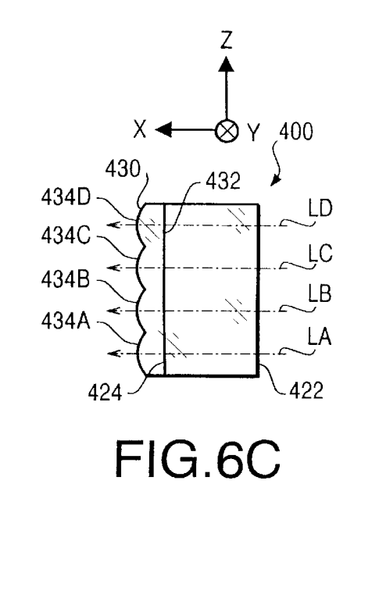
FIG. 6C is a side view of the first lens, viewed along arrow VIC in FIG. 6B.

FIG. 6A is a plan view of the first lens 400, FIG. 6B is a rear view thereof, viewed along arrow VIB in FIG. 6A, and FIG. 6C is a side view thereof, viewed along arrow VIC in FIG. 6B. In this modification, the first lens is configured to include a first lens element 420 and a second lens element 430. The first lens element 420 mainly has a power to converge the beams LA–LD in Y-axis direction (i.e., in the main scanning direction), and the second lens element 420 mainly has a power to converge the beams LA–LD in Z-axis direction (i.e., the auxiliary scanning direction), Thus, the first lens 400 converges the laser beams LA–LD both in the Y-axis and Z-axis directions. As a whole, the power in the auxiliary scanning direction is greater than that in the main scanning direction.

Specifically, in this modification, the second lens element 430 has a light receiving surface 432 and a light emerging surface 434. The light emerging surface 434 of the second lens element 430 is formed with convex surfaces 434A–434D for converging the beams LA–LD in the Z-axis direction, respectively, on the light receiving surface 432 (see FIG. 6C). As shown in FIG. 6B, the convex surfaces 434A–434D are formed with diffraction lens structures 436A–416D, respectively. Specifically, each of the diffraction lens structures 436A–436D is formed on a base curve, which is a rotationally symmetrical aspherical surface, for compensating for the lateral chromatic aberration caused by the refraction lens structure of the fθ lens system (i.e., the first, second and third lenses 400, 500 and 600).

Figure 7A:
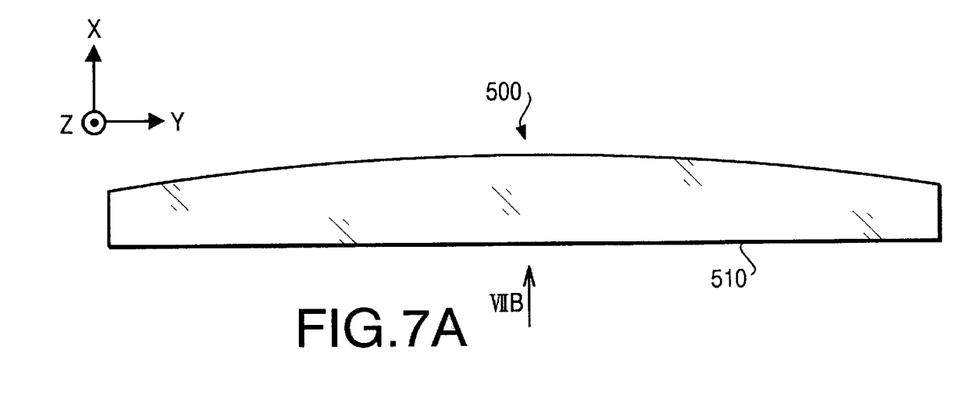
FIG. 7A is a plan view of a second lens according to a modification of the first embodiment.
Figure 7B:
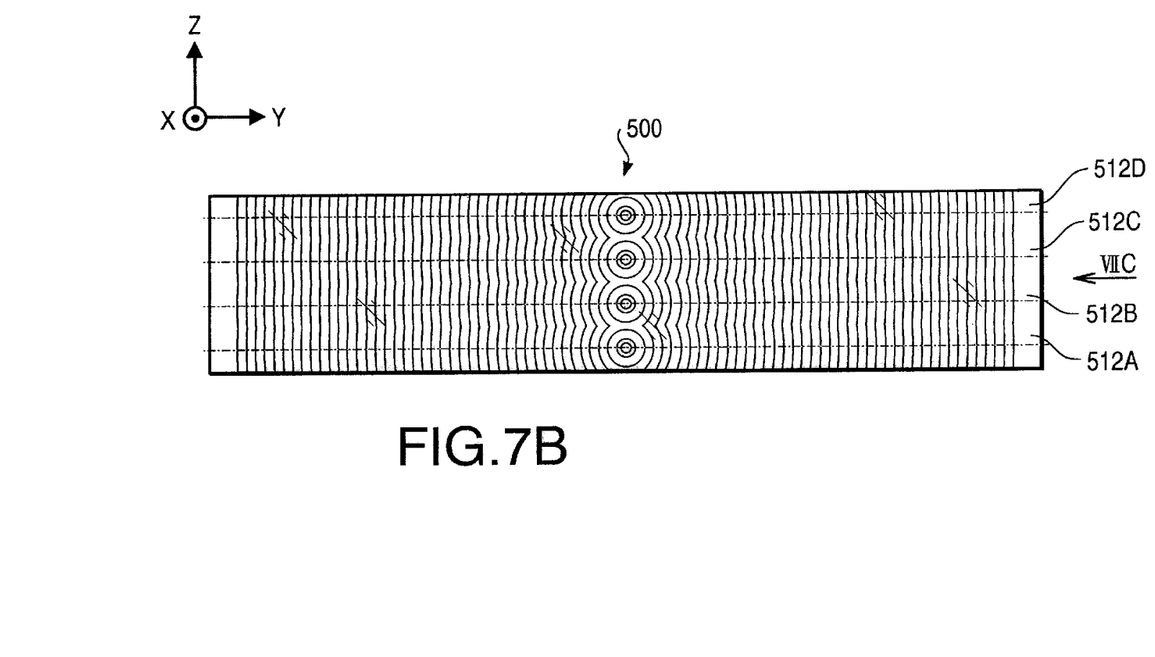
FIG. 7B is a front view of the second lens, viewed along arrow VIIB in FIG. 7A.
Figure 7C:
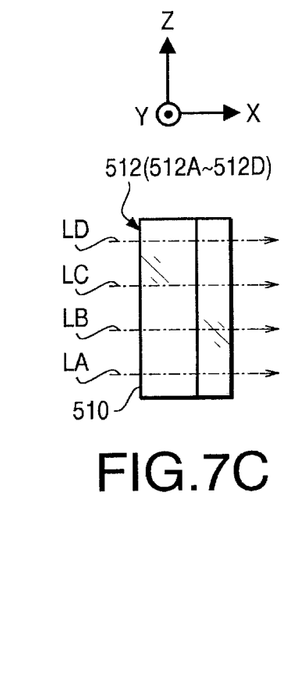
FIG. 7C is a side view of the second lens, viewed along arrow VIIC in FIG. 7B.

FIG. 7A is a plan view of the second lens 500 according to another modification of the invention, FIG. 7B is a front view thereof, viewed along arrow VIIB in FIG. 7A, and FIG. 7C is a side view thereof, viewed along arrow VIIC in FIG. 7B. In this modification, instead of the diffractive lens structures 416A–416D formed on the light receiving surface of the first lens 400, diffractive lens structure 512 (512A–512D) are formed on the light receiving surface 510 of the second lens 500.

In order to compensate for the lateral chromatic aberration of the fθ lens system in the main scanning direction effectively, it is preferable that the diffraction lens structures are located at a position where the laser beams LA–LD have not yet converged in the main scanning direction. Accordingly, it is preferable that the diffraction lens structure may be arranged to intersect the optical paths of the beams deflected by the polygonal mirror 320 and at a position closer to the polygonal mirror.

Specifically, the diffraction lens structure(s) may preferably be arranged (a) on the light receiving surface of the first lens 400, (b) on the light emerging surface of the first lens 400, (c) on the light receiving surface of the second lens 500, (d) on the light emerging surface of the second lens, (e) on the light receiving surfaces 600A–600D1 of the third lenses 600A–600D, or (f) on the light emerging surfaces 600A2–600D2 of the third lenses 600A–600D.

In particular, when the diffraction lens structures are formed on the surface of the first, second or third lenses, the refractive lens and the diffraction lens structures can be formed integrally using a mold. With such a configuration, the number of elements can be reduced.

As will be described hereafter, the diffraction lens structure can be arranged at a position other than the surface of the refraction lenses.

Second Embodiment

Figure 4:
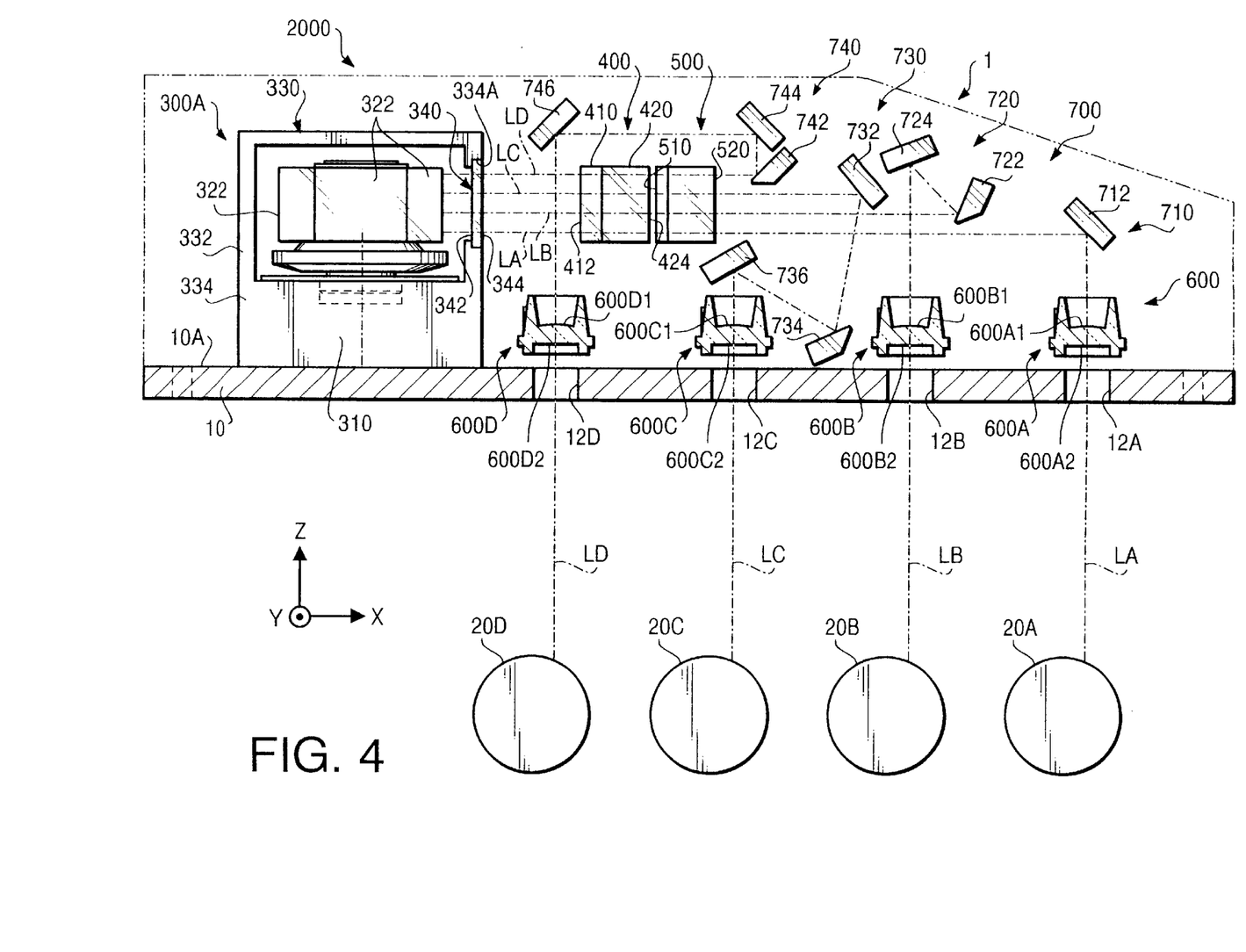
FIG. 4 is a cross sectional view of the multi-beam scanning optical system according to a second embodiment.
Figure 5A:
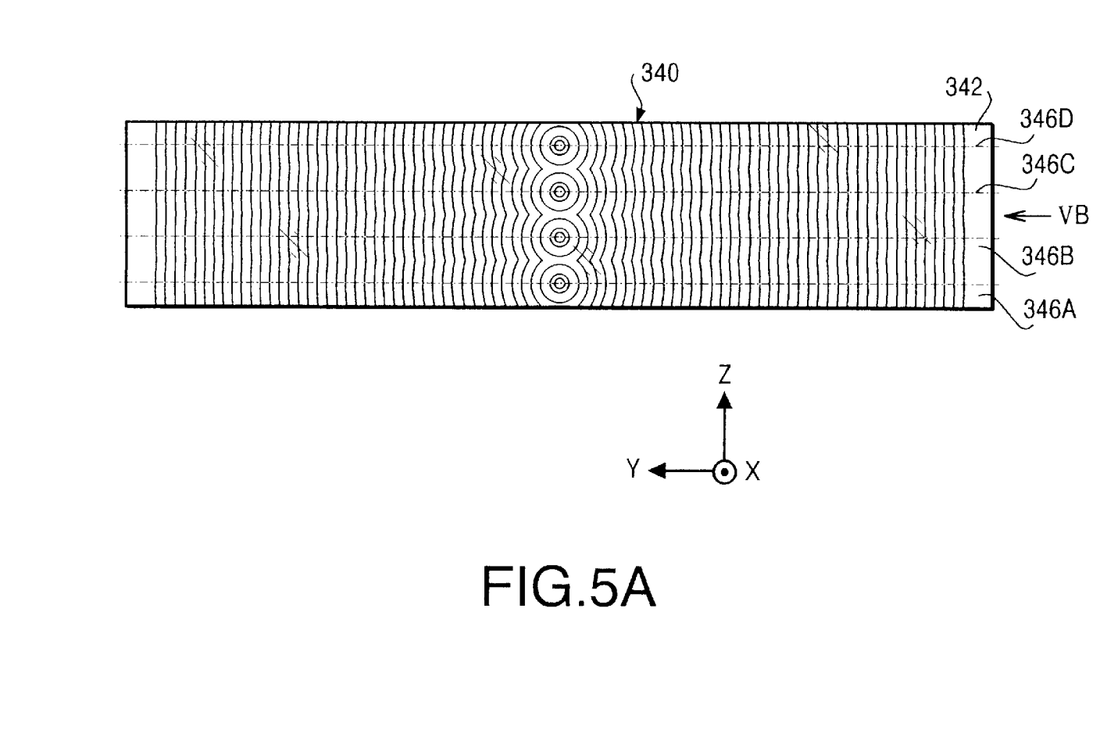
FIG. 5A is a rear view of light transmitting element.
Figure 5B:
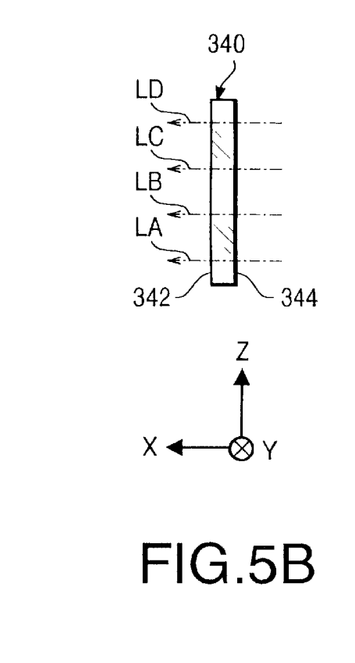
FIG. 5B is a side view of the light transmitting element.

FIG. 4 schematically shows a side view of a multi-beam scanning optical system 2000 according to a second embodiment of the invention. FIG. 5A is a front view of light transmitting element, and FIG. 5B is a side view of the light transmitting element. IN FIG. 4, elements similar to those in the first elements are given the same reference numbers, and the description thereof is omitted.

The multi-beam scanning optical system 2000 is similar to the scanning optical system 1000 except that the polygonal mirror unit 300A includes a cover 330 that surrounds the polygonal mirror 320, and the diffraction lens structure is formed on a part of the cover 330 in the second embodiment.

AS shown in FIG. 4, the cover 330 includes a cylindrical side wall 334 and a disk-shaped upper plate 332 closing the upper end of the cylindrical side wall 334. The lower end of the cylindrical side wall 334 is secured on the upper portion of the motor unit 310. Thus, the polygonal mirror 320 is enclosed inside the cylindrical side wall 334 and the upper plate 332 with predetermined clearance therebetween.

When the polygonal mirror 320 rotates at a high speed, (1) noise is generated, and (2) air flow is generated and dust around the polygonal mirror 320 is attracted by the polygonal mirror 320. If thus attracted dust is applied onto the reflection surfaces 332 of the polygonal mirror 320, the laser beams may not be reflected normally. To avoid the above problems, in the second embodiment, the cover 330 is provided. By enclosing the polygonal mirror with the cover 330, the noise is suppressed, and further, the attraction of dust due to the air flow is prevented.

On the side wall 334, at a portion facing the laser diodes 120A–120D and the light receiving surface 410 of the first lens 400 is formed to be a through opening 334A, and a light transmitting member 340 is fitted in the through opening 334A.

Therefore, the laser beams LA–LD emitted by the laser diodes 120A–120D are incident on the polygonal mirror 320 through the light transmitting member 340, deflected by the polygonal mirror 320, and directed to the first lens 400 through the light transmitting member 340.

FIG. 5A is a rear view of the light transmitting member 340 viewed from the first lens side. FIG. 5B is a side view of the light transmitting member 340 viewed along arrow VB in FIG. 5A. The light transmitting member 340 is a transparent parallel plate having a first surface 344 facing the polygonal mirror 320, and a second surface 342, which is a surface opposite to the first surface 344, facing the light receiving surface 410 of the first lens 400. On the second surface 342 of the light transmitting member 340, diffraction lens structures 346A–346D are formed at positions corresponding to the laser beams LA–LD for compensating for the lateral chromatic aberration caused by the refraction lens structure of the fθ lens system.

Thus, according to the second embodiment, the lateral chromatic aberration caused by the refraction lens structure of the fθ lens system in the main scanning direction can be compensated by the diffraction lens structures 346A–346D.

It should be noted that the location of the diffraction lens structure 346A–346D is closer to the polygonal mirror 320 than the location of the diffraction lens structures 414A–414D according to the first embodiment. Therefore, compensation for the lateral chromatic aberration can be achieved more effectively than in the first embodiment.

In the second embodiment, the diffraction lens structure is provided on the second surface 342 of the light transmitting member 340. Such a structure is advantageous because of the following reason. When the polygonal mirror 322 rotates at a high speed, airflow is caused. If the stepped structure of the diffraction lens faces the polygonal mirror, noises may be generated. According to the above structure, since the first surface 344 is a flat surface, generation of such a noise can be avoided. However, the invention is not limited to this structure, but can be modified such that, for example, the diffraction lens structure is provided on the first surface 344 of the light transmitting member 340 if the noise generated by the airflow is negligible.

In the second embodiment, the beams incident on the polygonal mirror 320 and the beams deflected by the polygonal mirror 320 pass through the same opening 334A. It is of course possible to form two openings: one for the incident beams; and the other for emerging beams. In such a case, the diffraction lens structure may be formed only on the surface of a light transmitting member provided at the opening for the emerging beams.

In the first and second embodiments, four laser diodes 110A–110D corresponding to four colors (yellow, magenta, cyan and black) are used, and the four beams emitted by the four laser diodes 110A–110D are directed to the photoconductive drums 20A–20D to form four color component images. The invention is not limited to such a configuration. The invention can also be applied to a multi-beam scanning optical system using only three laser beam.

In the embodiments described above, the fθ lens system is constituted to have three lenses, the first lens converging the beams in the auxiliary scanning direction, the second lens converging the beams in the main scanning direction, and the third lens converges the beams in the auxiliary scanning direction. It should be noted that the configuration of the fθ lens system is not limited to such structures. For example, the directions in which the beams are converged by the first, second and third lenses are not limited to the above-described direction. The second and the third lenses may be constituted to have power both in the main scanning direction and the auxiliary scanning direction. Further, the number of lenses constitute the fθ lens system is not limited to three.

The present disclosure relates to the subject matter contained in Japanese Patent Application No. HEI 11-310489, filed on Nov. 1, 1999, which is expressly incorporated herein by reference in its entirety.

What is claimed is:

1. A multi-beam scanning optical system, comprising:
a light source unit emitting a plurality of light beams, said plurality of beams being parallel to each other;
a polygonal mirror having a plurality of reflection surfaces arranged along a rotational direction of said polygonal mirror, the plurality of beams emitted by said light source unit being incident on said polygonal mirror and reflected by the reflection surfaces of said polygonal mirror; and
an fθ lens system, the plurality of beams reflected by the reflection surface of said polygonal mirror passing through said fθ lens system and proceeding toward surfaces to be scanned,
wherein said fθ lens includes a first lens, a second lens and a third lens, said plurality of beams deflected by said polygonal mirror being incident on said first, second and third lenses in this order,
wherein said first lens consists of a first lens element and second lens element, said plurality of beams being incident on said first and second lens elements in this order, said first lens element converging said plurality of beams in an auxiliary scanning direction, said second lens element converging said plurality of beams in a main scanning direction, and
wherein a plurality of convex surfaces corresponding to said plurality of beams are formed on one of surfaces of said first and second lens elements, said plurality of convex surfaces extending in the main scanning direction, said plurality of convex surfaces converging said plurality of beams in the auxiliary scanning direction, respectively, a diffraction lens structure for compensating for lateral chromatic aberration caused by a refraction lens structure of said fθ lens system being formed on each of said plurality of convex surfaces.

2. The multi-beam scanning optical system according to claim 1, wherein said convex surfaces are formed on a light receiving surface of said first lens element.

3. The multi-beam scanning optical system according to claim 2, wherein said first lens converges said plurality of beams mainly in the auxiliary scanning direction.

4. The multi-beam scanning optical system according to claim 1, wherein said convex surfaces are formed on a light emerging surface of said second lens element.

5. The multi-beam scanning optical system according to claim 4, wherein said first lens converges said plurality of beams mainly in the auxiliary scanning direction.

6. The multi-beam scanning optical system according to claim 1, wherein said first lens element, said second lens element and said diffraction lens structure are integrally formed.

7. The multi-beam scanning optical system according to claim 1, wherein said second lens converges said plurality of beams mainly in the main scanning direction.

8. A multi-beam scanning optical system, comprising:
a light source unit emitting a plurality of light beams, said plurality of beams being parallel to each other;
a polygonal mirror having a plurality of reflection surfaces arranged along a rotational direction of said polygonal mirror, the plurality of beams emitted by said light source unit being incident on said polygonal mirror and deflected by the reflection surfaces of said polygonal mirror;
an fθ lens system, the plurality of beams reflected by the reflection surface of said polygonal mirror passing through said fθ lens system and proceeding toward surfaces to be scanned; and
a cover member that surrounds said polygonal mirror, at least a first portion, through which said plurality of beams directed to said polygonal mirror enter, and a second portion, from which said plurality of beams reflected by said polygonal mirror emerge, are formed to be light transmitting portions; and
wherein a plurality of diffraction lens structures corresponding to said plurality of beams for compensating for lateral chromatic aberration caused by a refraction lens structure of said fθ lens system are formed at least on said second portion.

9. The multi-beam scanning optical system according to claim 8,
wherein a through opening is formed on said cover member,
wherein a light transmitting member fitted in said opening, said light transmitting member including said first and second portions.

10. The multi-beam scanning optical system according to claim 9, wherein said plurality of diffraction lens structure being formed either of said first and second portions.

* * * * *